Figure 1:
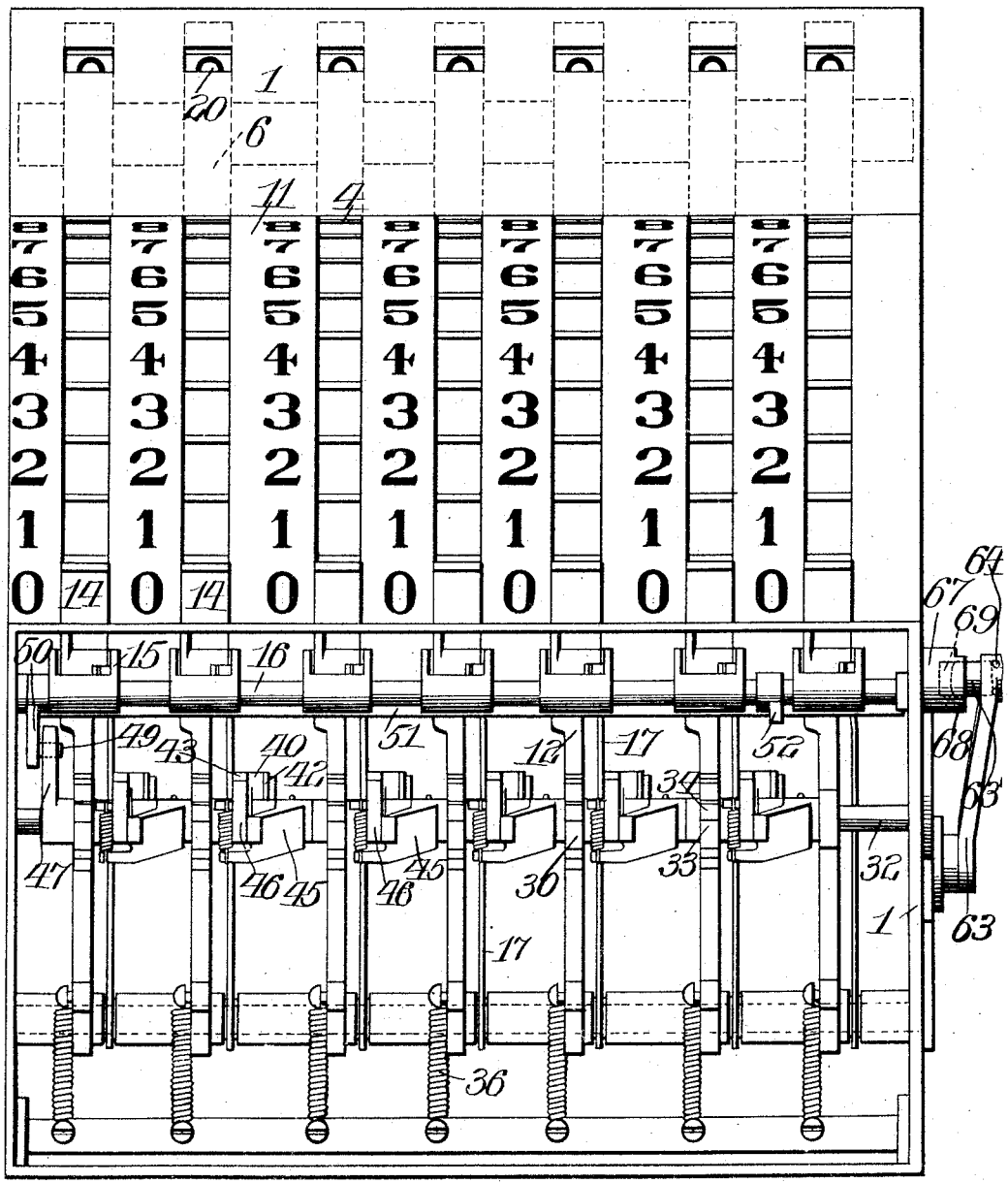

No. 894,347. PATENTED JULY 28, 1908.
G. H. SEARS.
CALCULATING MACHINE.
APPLICATION FILED NOV. 12, 1902.

7 SHEETS—SHEET 1.

Witnesses
Walter B. Payne.
G. Willard Rich.

Inventor
George H. Sears
By Frederick S. Church
his Attorney

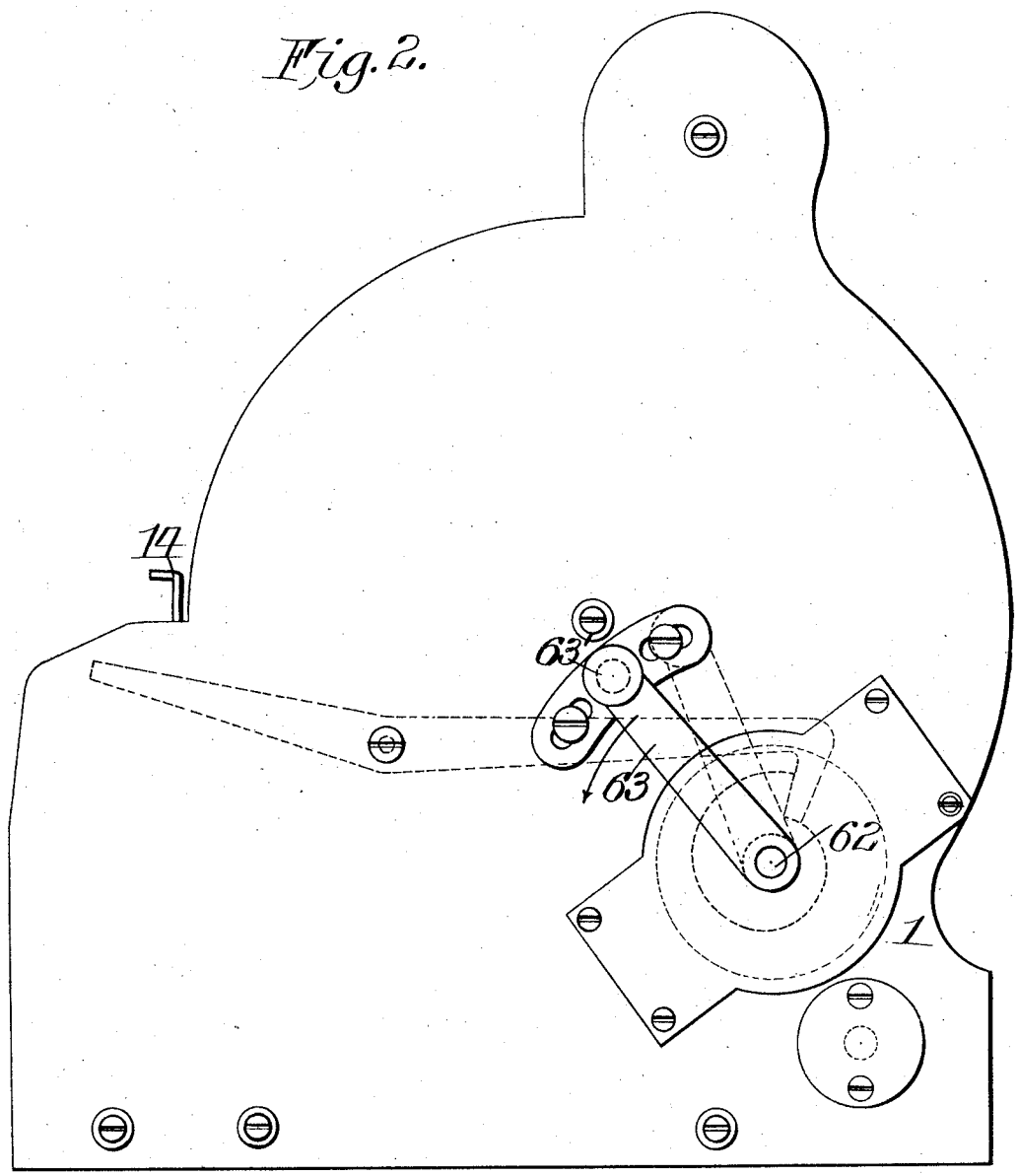

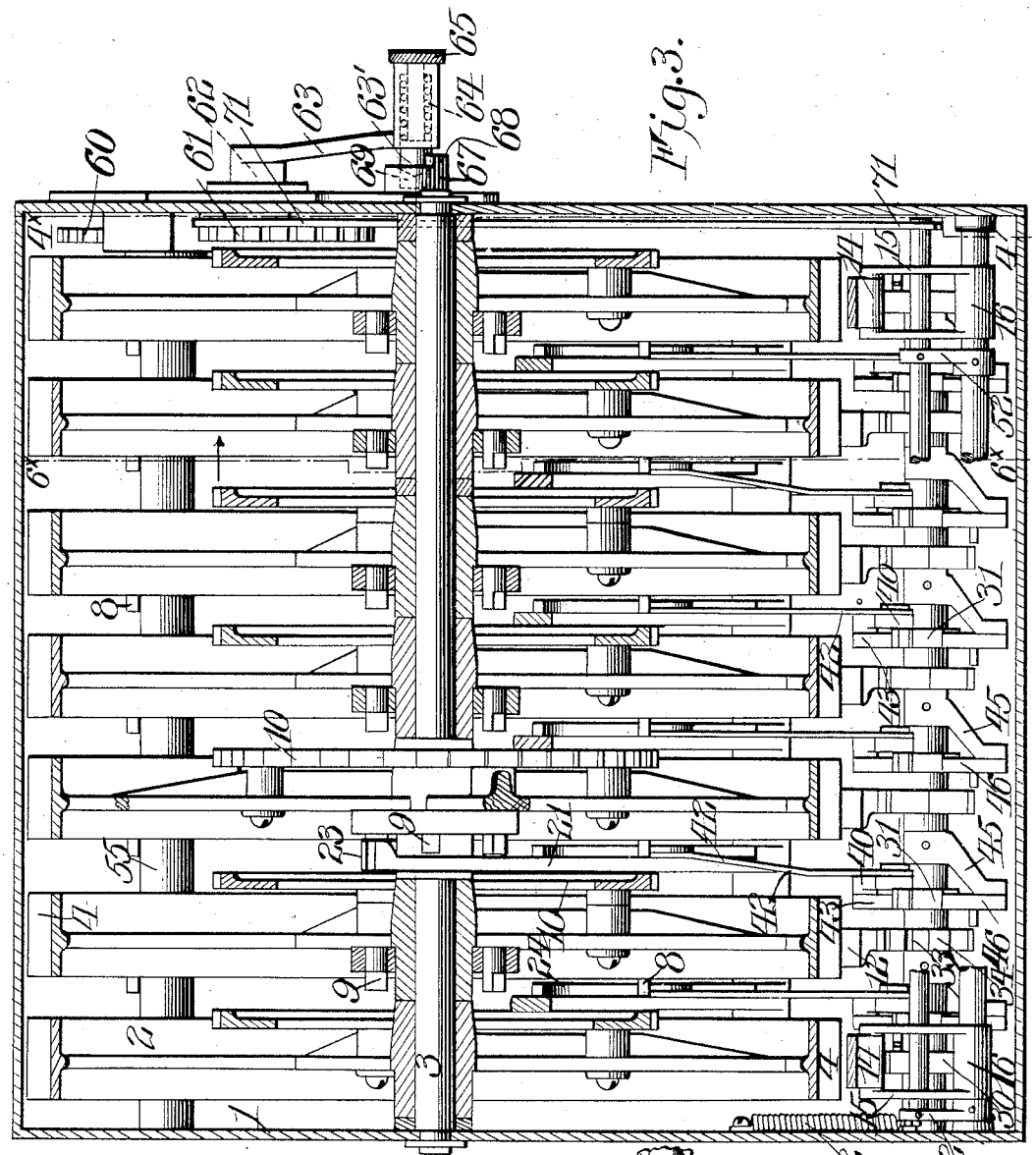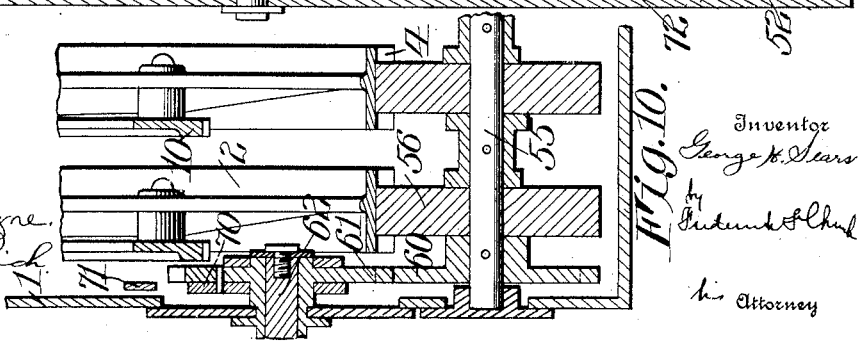

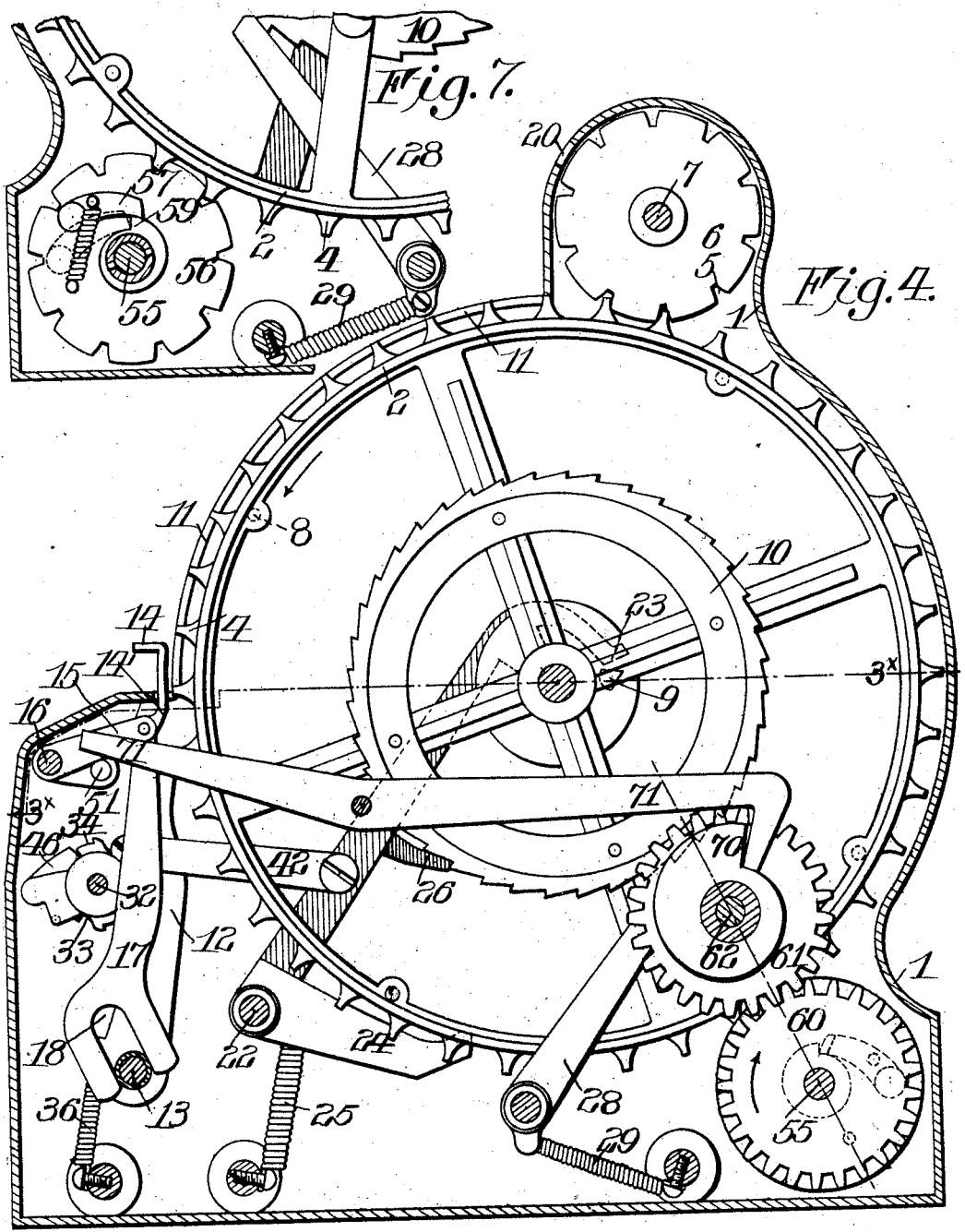

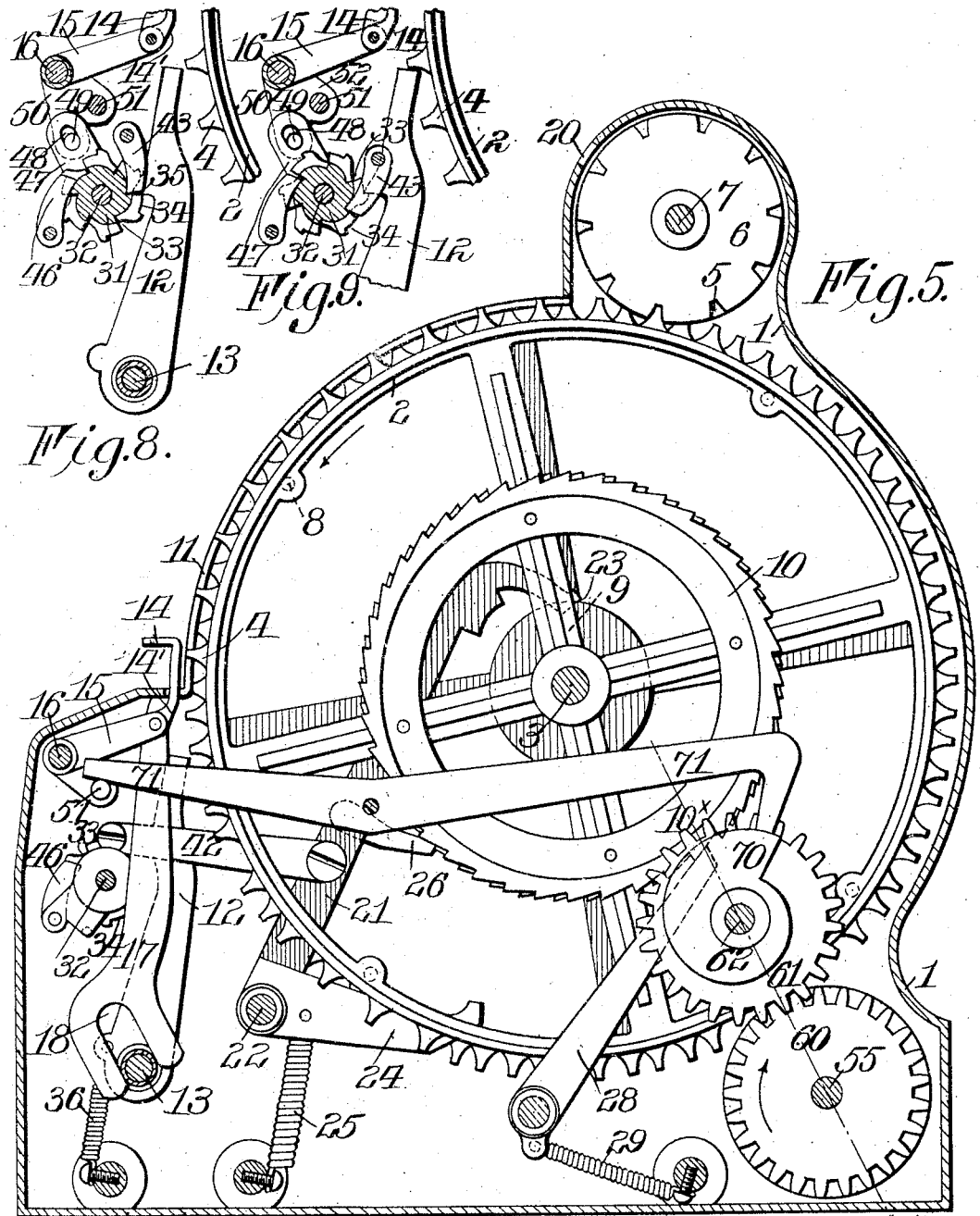

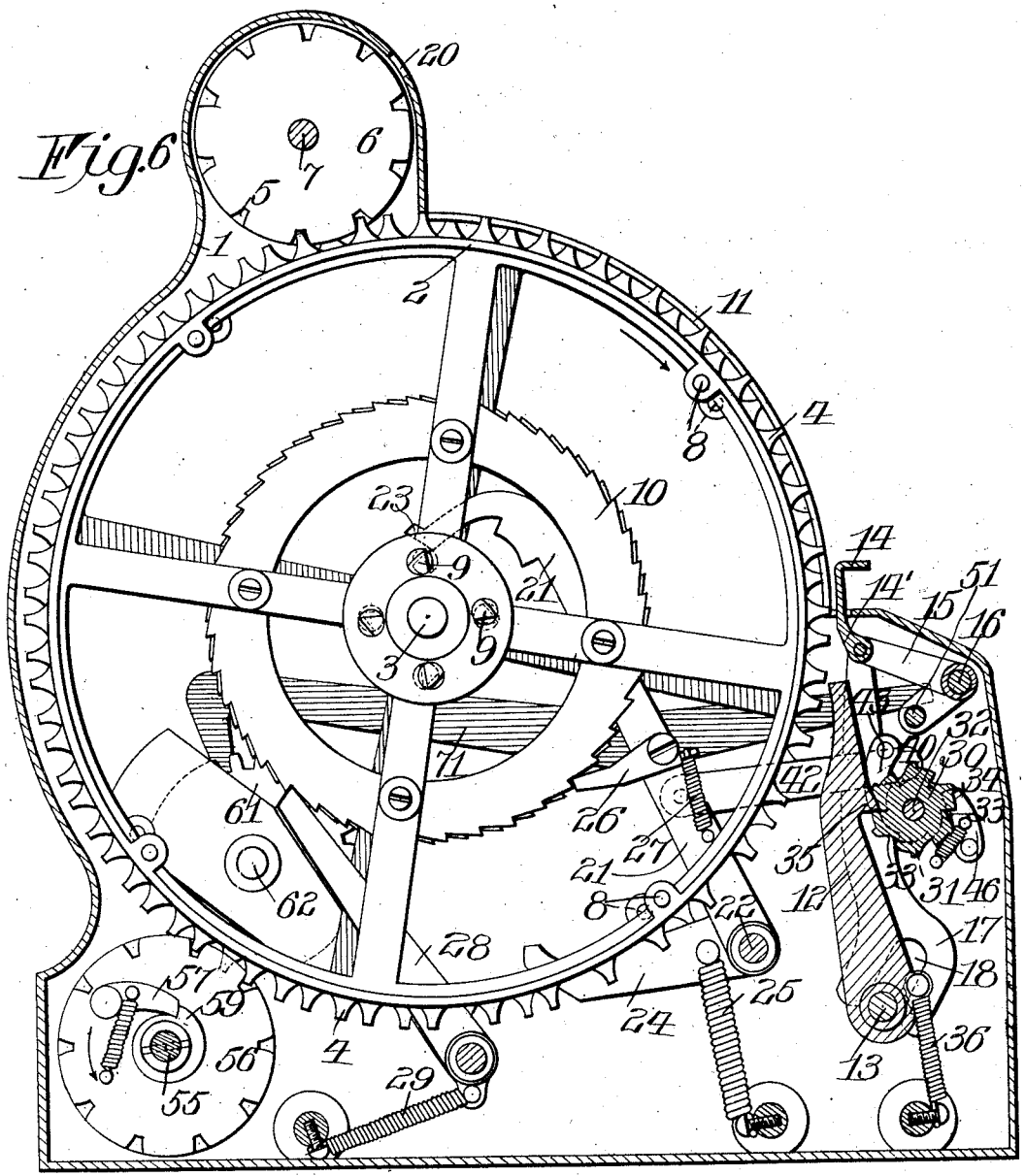

No. 894,347. PATENTED JULY 28, 1908.
G. H. SEARS.
CALCULATING MACHINE.
APPLICATION FILED NOV. 12, 1902.
7 SHEETS—SHEET 7.
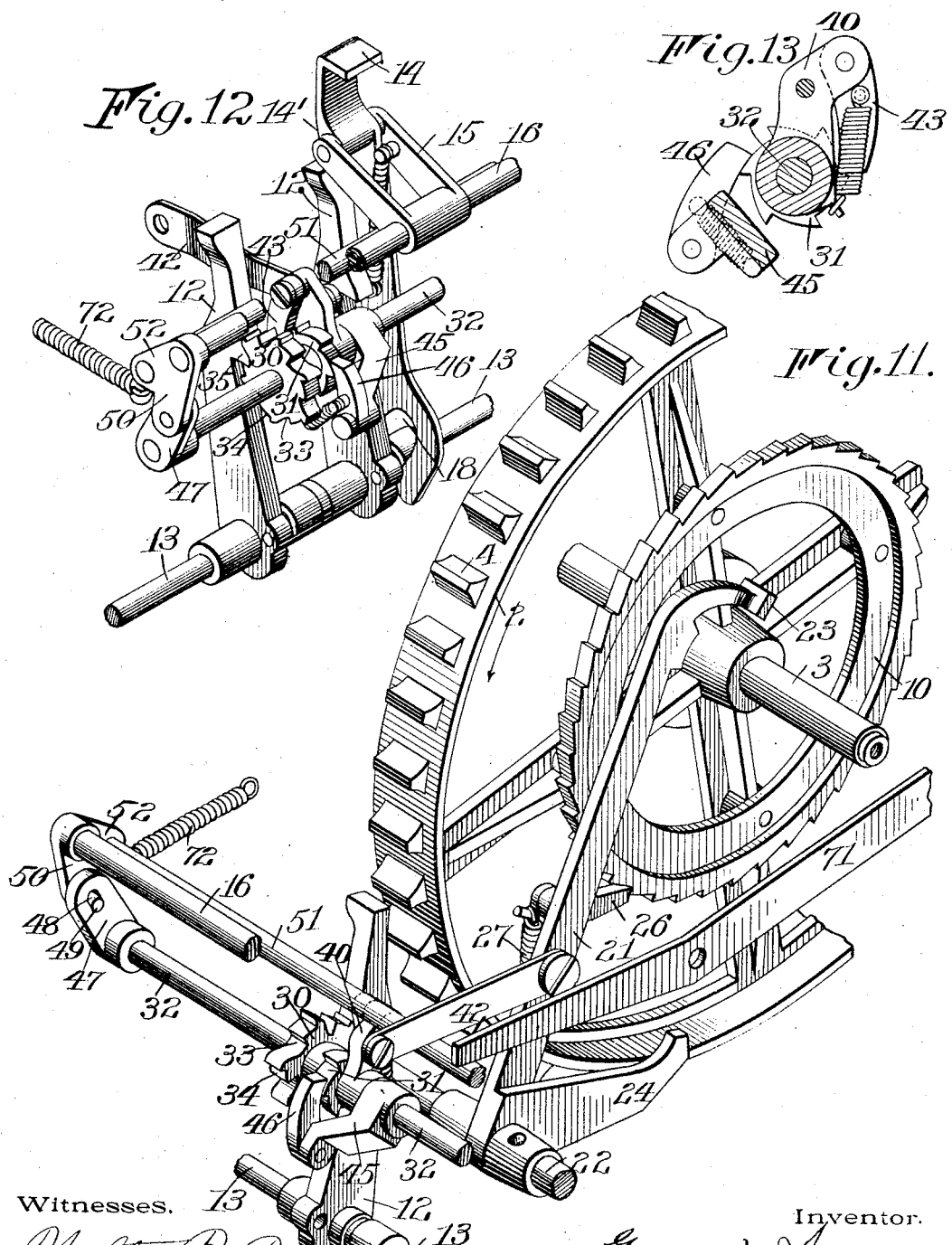
Witnesses.
Walter B. Payne
G. Willard Rich
Inventor.
George H. Sears
By Frederick F. Church
Attorney.

UNITED STATES PATENT OFFICE.

GEORGE H. SEARS, OF ROCHESTER, NEW YORK, ASSIGNOR, BY DIRECT AND MESNE ASSIGNMENTS, OF THREE-FOURTHS TO ANGUS E. HUTHER AND WARREN B. HUTHER, OF ROCHESTER, NEW YORK.

CALCULATING-MACHINE.

No. 894,347.  Specification of Letters Patent.  Patented July 28, 1908.

Application filed November 12, 1902. Serial No. 130,970.

*To all whom it may concern:*

Be it known that I, GEORGE H. SEARS, of Rochester, in the county of Monroe and State of New York, have invented certain new and useful Improvements in Calculating-Machines; and I do hereby declare the following to be a full, clear, and exact description of the same, reference being had to the accompanying drawings, forming a part of this specification, and to the reference-numerals marked thereon.

My present invention relates to calculating machines and particularly to that class known as adding machines such as illustrated in my former application for Letters Patent Serial No. 108,866 and it embodies generally a plurality of counter wheels capable of independent operation, having characters thereon, transfer devices or carrying mechanisms intermediate the wheels whereby the rotation of one wheel through a predetermined distance causes the next higher wheel to be actuated and locking devices for arresting the motion of the wheels when not properly operated, and it further provides means for resetting the wheels with their zero characters, or any other predetermined character, in position for a new calculation.

To these and other ends my invention consists in certain improvements in construction and combination of parts all as will be more fully described, the novel features being pointed out in the claims at the end of the specification.

In the drawings: Figure 1 is a front view of a calculating machine constructed in accordance with my invention. Fig. 2 is an end view of the same. Fig. 3 is a horizontal sectional view on the line $3^\times$—$3^\times$ of Fig. 4. Fig. 4 is a vertical sectional view on the line $4^\times$—$4^\times$ of Fig. 3 showing the resetting mechanism in its normal position. Fig. 5, is a similar view illustrating the operation of said mechanism. Fig. 6, is a sectional view on the line $6^\times$—$6^\times$ of Fig. 3, looking in the direction indicated by the arrows. Fig. 7 is a detail sectional view of the resetting devices. Figs. 8 and 9 are detail views illustrating the operation of the interlocking mechanism and the controlling devices therefor. Fig. 10 is a sectional view on the line $10^\times$—$10^\times$ of Fig. 5. Fig. 11 is a detached perspective view showing one of the computing wheels and coöperating parts. Fig. 12 is a similar view of the carrying and locking mechanisms. Fig. 13 is a detail view.

Similar reference numerals in the several figures indicate similar parts.

A calculating machine constructed in accordance with my invention embodies a casing 1 in which is mounted a series of operating or computing wheels 2 loosely journaled on a shaft 3 as shown in Figs. 4, 5 and 6. The several wheels are alike in construction and are provided with teeth 4 meshing with notches 5 in counterwheels 6 journaled on a shaft 7, the number of teeth being a multiple of ten, the number of teeth in the counterwheels (in this case four multiples). Between the notches on the counterwheels 6 are provided the ten digits from 0 to 9 adapted to register with apertures 20 in the casing (see Fig. 1) through which they may be read and the calculation, indicated thereby, readily determined. On one side of each of the wheels 2 are laterally projecting pins 8, near the rim, and pins 9 near the center and on the other side is a ratchet wheel 10 (see Fig. 6) the function of which will be presently explained. The casing 1 is provided with curved bands 11 between the teeth 4 of the adjacent wheels and upon the faces of the bands are provided the digits from 0 to 9 arranged consecutively and reading from the bottom upward or in a direction opposite to that in which the wheels 2 revolve and forming an index for the latter.

To prevent the computing wheels 2 and consequently the counters 6 from being moved too far at a single operation I provide pawls 12 (Figs. 6 and 12) pivoted on a shaft 13 extending in front of the operating wheels and adapted to be operated into engagement with the teeth 4 on the wheels at the completion of each operation of the latter. The movement of the pawls is accomplished by means of keys 14 each pivoted to an arm 15 journaled loosely on a shaft 16 and provided with a cam surface 14' adapted when the key is depressed to engage the pawl 12 to cause it to be moved into engagement with the operating wheel. Attached to the keys 14 are guide plates 17 having slots 18 forming the bifurcated ends engaging over the shaft 13 and arranged in such a manner that as the keys 14 are depressed their upper ends will be moved vertically irrespective of the short pivotal movement of the links 15.

When the zero character of one of the counterwheels 6 registers with the aperture 20 in the casing the operating or computing wheel of the next counterwheel to the left, which for convenience in explanation will be termed the higher wheel, will be actuated by the operating or computing wheel of the former or lower wheel the distance of one space by suitable actuating or carrying devices as will now be described. The carrying devices embody levers 21 arranged between the operating wheels and pivoted on a shaft 22. Each of the levers have at their outer ends faces 23 adapted to coöperate with the pins 9 on the wheels 2 whereby as the latter are revolved their coöperating levers are raised to the position shown in Figs. 5 and 6. At the lower ends of the levers 21 are provided arms 24 and connected thereto are coil springs 25 whereby the positive operation of the levers is insured when the pins 9 are rotated out of engagement with the faces 23. Also arranged on the levers 21 are pivoted pawls 26, operated by springs 27, and engaging the ratchet wheel 10 on the next higher wheel to propel the latter the distance of one space when the lever 21 is released as will be readily understood. The ends of the arms 24 are arranged so that as the levers 21 are raised as shown in Figs. 5 and 6 they will lie in the path of the pins 8, on the adjacent lower wheel 2, and said pins engaging therewith will insure the downward movement of the levers and assist in propelling the adjacent higher wheel. It will be noted however that if the return of a lever is prevented the arm 24 thereof, being held in the path of the pin 8, the rotation of the lower wheel will also be arrested, indicating to the operator that an error has occurred. To prevent the rearward motion of the computing wheels, pawls 28 operated by springs 29 engage the ratchets 10 permitting the rotation of the wheels in but one direction, as shown in Fig. 6.

The mechanism by means of which the transferring devices or levers 21 are controlled, to permit the operation of the wheels, only when the releasing keys are operated, consists of the governing wheels 30, formed integrally with the ratchets 31 and mounted on a shaft or arbor 32, arranged one for each computing wheel, as shown in Figs. 11 and 12, said governing wheels being provided with deep and shallow notches 33 and 34 respectively providing the teeth, as shown, which are arranged in pairs, one pair for each tooth on the ratchet 31. These teeth coöperate with a projection 35 on the pawl 12 and serve to alternately throw the end of the latter into and out of engagement with the teeth of the wheels 2. Springs 36 attached to the pawls 12 retract them, as shown in Fig. 6, when the governing wheel is revolved, so that the projection 35 drops into one of the deep notches 33.

The shaft or arbor 32 is journaled in the casing and movably mounted thereon are levers 40 connected by means of links 42 with the levers 21 (see Fig. 11) and on the levers 40 are pawls 43 adapted to engage with the ratchet wheels 31 (see Fig. 13) to revolve them a distance of one half the length of a single tooth. Each operation of one of the levers 21, it will be seen, causes its corresponding governing wheel to be revolved to throw the pawl 12 into the operative position, thus locking the higher wheel until the pawl is released. Rigidly secured to the shaft 32 are levers 45 carrying pawls 46 also adapted to engage with the ratchets 31 and at one end of the shaft is a lever 47 having a slot 48 in which operates a pin 49 on a lever 50 rigidly fastened to the shaft 16, as shown in Figs. 11 and 12. A rod 51 passing beneath the arms 15 of all of the keys is attached to the shaft 16 by arms 52 so that by depressing a single one of the releasing keys the shaft or arbor 32 is oscillated to cause the pawls 46 to move into the position to engage the ratchet wheel, so that the governing wheel will release the pawl which was previously operated by the lever 21. It will be seen from this that when the higher wheel is actuated by the movement of the lower one without depressing the key 14 of the latter, the higher wheel is locked by its pawl 12 which is held in engagement therewith by one of the shallow notches 34 of its respective governing wheel and the continued motion of the lower wheel raises the lever 21 on the higher wheel until the pawl 26 engages in rear of another tooth of the ratchet 10. The higher wheel being prevented from rotating will hold the lever in the raised position with the projection 24 in path of the pin 8, thereby preventing the further rotation of the lower wheel until the higher one is unlocked by a movement of the governing wheel to allow the projection 35 on the pawl 12 to drop into one of the deep notches 33 therein.

In order to start a new calculation the several wheels must be set so that the zero characters on all of the counterwheels will appear through the apertures 20 in the casing. This can be done by manipulating the several computing wheels, as described in my prior application, but to more easily accomplish this I have devised a resetting mechanism that will perform the same result with the exercise of much less care on the part of the operator. Journaled in the casing is a shaft 55 and loosely mounted thereon are gear wheels 56 meshing with the teeth 4 on the wheels 2 and adapted to be revolved in one direction by the rotation of the shaft 55 and for this purpose the gear wheels are provided with pawls 57 bearing against collars on the shaft each of which is provided with a single ratchet tooth 59. This arrangement it will be seen permits the resetting gear wheels 56 to be revolved freely in one direction during the manipulation of the operating wheels 2 and when the shaft 55 is revolved in the direction indicated by the arrow, Figs. 4 and 5, the teeth 59 on the several collars will engage the pawls 57 at some point in their revolution and cause the respective gear wheels to revolve sufficiently to move their corresponding wheels 2 through a distance of from one to ten spaces so that all of the counter wheels 6 will be turned the required distance to bring the zero character on each beneath the apertures 20.

The shaft 55 may be revolved in any convenient manner but the means which I have shown for operating it consists of a gear wheel 60, mounted at one end thereof, with which engages a similar gear wheel 61 mounted on a stud 62 journaled in a bearing on the frame and provided at its outer end with a crank or operating handle 63, as shown in Figs. 1 and 2. As it is only necessary to revolve the shaft 55 a complete revolution to reset the machine, I provide upon the outer end of the handle a plunger 63' operated toward the casing by a spring 64 and provided with a head 65 whereby it may be retracted to release the handle. Adjustably mounted on the casing is a boss 67 provided at one side with a stop 68 and at the forward side of the latter with a depression or socket 69 in which the plunger normally engages to prevent the accidental movement of the handle. Also attached to the gear wheel 61 is a cam 70 and coöperating therewith is a pivoted lever 71 one end of which extends over the rod 51 whereby the shaft 32 is oscillated to operate the governing wheels 30 and release the pawls 12 subsequent to their operation by the dropping of the levers 21 as before described.

The operation will now be readily understood. When it is desired to begin a calculation the operator withdraws the plunger 63' from engagement with the boss 67 and rotates the crank one revolution in the direction indicated by the arrow in Fig. 2, bringing the pin again into register with the socket 69. During this rotation the counterwheels have been revolved until the characters 9 on each appear through the apertures 20 when their continued rotation releases the levers 21 and the latter revolve their respective operating wheels forward one space thus bringing the zero characters on all of the counterwheels, excepting the lower or units wheel into the initial position beneath the apertures 20. The latter wheel however is brought to the initial or zero position by the rotation of the shaft 55, somewhat in advance of the higher wheels, for the purpose of insuring the operation of the lever 21, operated thereby, in advance of the other levers, so that through any inaccuracy of fitting, or operation of the parts, the second or subsequent levers cannot perchance operate previous to the first one of said levers.

The operating or computing wheels are divided into a multiple number of ten spaces and a tooth 4 is provided thereon for every space while the resetting gear wheels 56 are provided with ten teeth. It will be seen from this that for each rotation of the resetting wheels the computing wheels are moved through the distance of one of the multiples so that upon rotating the shaft 55 all of the computing wheels will be moved, some a greater or less distance than the others, until the corresponding spaces on all the wheels are in parallel and then the completion of said movement sets the wheels in the initial position preparatory to beginning a new calculation. The movement of the levers 21 operates the pawls to lock the wheels, but during the rotation of the crank to the point at which the levers were released, the cam 70 has been moving the lever 71 upward thereby causing the bar 51 to be moved to the position shown in Fig. 5, rocking the shaft 32 until the pawls 46 assume the position, shown in Fig. 9, in rear of the teeth of the ratchets 31. The lever 71 being then released allows the spring 72 (see Figs. 3, 11 and 12) to return the shaft 32 and rotate the governor wheels to the position in which the projections 35 on the pawls will drop into the deep recesses 33 and allow the pawls to be retracted by the springs 36.

In making a computation the figures to be added in the units, tens, hundreds, etc. columns are computed upon their respective wheels by revolving the latter one at a time through a number of spaces equal to the number to be added, such spaces being indicated by the figures on the casing. When the sum of any two figures added in the same column is equal to or exceeds ten the operating wheel 2 will be revolved a sufficient distance to cause one of the pins 9 to move the lever 21, from the position shown in Fig. 4, to that shown in Fig. 5, when it carries the next higher wheel a distance of one space, as will be understood.

While the operating wheels might be provided with a series of digits upon their faces, arranged from zero to nine, it would necessitate increasing the width of the wheels and consequently materially adding to the width of the machine and to avoid this and other objections I provide the separate counterwheels 6 which are conveniently located at the upper part of the casing. Inasmuch as devices of this nature are used particularly for computing amounts of money I separate the first and second counter wheels and their respective operating or computing wheels, indicating the units and tens in the columns devoted to cents, from the third wheel and I likewise separate the fifth and sixth wheels a greater distance than the others, as shown, to more readily assist an operator to place his finger into engagement with the wheel corresponding to the column in which he desires to add a figure.

I claim as my invention:

1. In a calculating machine, the combination with a casing having openings therein, a plurality of computing wheels journaled in the casing and having their faces exposed in the openings therein and adapted to be rotated in one direction by manual engagement by the operator's finger, said wheels having their faces divided into a multiple number of spaces and resetting wheels coöperating with the computing wheels, of means independent of the computing wheels for operating each of the resetting wheels to revolve the computing wheels to bring a predetermined space of one of the multiple number of spaces on each wheel into the initial position.

2. In a calculating machine, the combination with a casing having openings therein, a plurality of computing wheels journaled in the casing and having their faces exposed in the openings therein and adapted to be rotated in one direction by manual engagement by the operator's finger, said wheels having their faces divided into a multiple of spaces and provided with teeth and a resetting device coöperating with the teeth on each wheel, of mechanism independent of the computing wheels for the resetting devices and connections between said devices and the operating mechanism for rotating the computing wheels separately into an initial position.

3. In a calculating machine, the combination with a casing having openings therein, a plurality of computing wheels journaled in the casing and having their faces exposed in the openings therein and adapted to be rotated in one direction by manual engagement by the operator's finger, said wheels having a multiple number of teeth thereon and a resetting shaft, of gear wheels coöperating with the computing wheels and independently movable on the shaft in the direction of movement imparted to them by their computing wheels and provided with teeth equal in number to one multiple, a pawl and ratchet connection between the shaft and each gear wheel, means for rotating the shaft in the direction of rotation of the gear wheels and carrying devices operated by the computing wheels.

4. In a calculating machine, the combination with a casing having openings therein, a plurality of computing wheels journaled in the casing and having their faces exposed in the openings therein and adapted to be rotated in one direction by manual engagement by the operator's finger, said wheels having teeth thereon and a resetting shaft, of gear wheels mounted loosely thereon and coöperating with the computing wheels, clutch connections between each gear wheel and the shaft, operating when the latter is rotated in one direction to revolve the computing wheels and carrying devices operated by the computing wheels.

5. In a calculating machine, the combination with a casing having openings therein, a plurality of computing wheels journaled in the casing and having their faces exposed in the openings therein and adapted to be rotated in one direction by manual engagement by the operator's finger, said wheels having a multiple number of teeth thereon and a shaft, of gear wheels coöperating with the computing wheels and provided with teeth equal in number to one multiple, a pawl and ratchet connection between the shaft and each gear wheel, means for revolving the shaft a single rotation at one operation to set the computing wheels with one of their multiple divisions in the initial position and carrying devices operated by the computing wheels.

6. In a calculating machine, the combination with a plurality of manually operated computing wheels and locking devices therefor, of resetting mechanism engaging the computing wheels, means for operating said mechanism and connections between said operating means and the locking devices for releasing the computing wheels.

7. In a calculating machine, the combination with a plurality of manually operated computing wheels, carrying devices arranged between them, locking devices operated thereby and releasing mechanism for the latter, of resetting devices coöperating with the computing wheels, means for operating said devices and connections between said operating means and the releasing devices for unlocking the wheels.

8. In a calculating machine, the combination with computing wheels, a carrying device between them, a lock for the computing wheels operated by the carrying device, and means for releasing the lock, of a shaft, resetting wheels thereon coöperating with the computing wheels, means for revolving the shaft to rotate the resetting wheels and connections between it and the lock releasing means.

9. In a calculating machine, the combination with a casing having openings therein, a plurality of computing wheels journaled in the casing and having their faces exposed in the openings therein and adapted to be rotated in one direction by manual engagement by the operator's finger, said wheels having a multiple number of ten spaces thereon, of a shaft, resetting wheels thereon rotated in one direction by the computing wheels, means for operating the latter to revolve each of the computing wheels through a distance of one or more spaces to place a predetermined space of one of the multiples of each wheel in the initial position and carrying devices operated by the computing wheels.

10. In a calculating machine, the combination with a casing having openings therein, a plurality of computing wheels journaled in the casing and having their faces exposed in the openings therein and adapted to be rotated in one direction by manual engagement by the operator's finger, said wheels having a multiple number of ten spaces thereon and a shaft, of resetting wheels on the latter engaging the computing wheels and revolved freely thereby in one direction, pawls on said wheels and a ratchet tooth on the shaft engaging each pawl, means for revolving the shaft to rotate the computing wheels through a distance of a complete multiple of spaces and carrying devices operated by the computing wheels.

11. In a calculating machine, the combination with a casing having openings therein, a plurality of computing wheels journaled in the casing and having their faces exposed in the openings therein and adapted to be rotated in one direction by manual engagement by the operator's finger, the rims of said wheels being divided into a multiple of ten spaces, a tooth thereon for each space carrying devices operated by the computing wheels and a shaft, of resetting gear wheels on the shaft meshing with the teeth on the computing wheels, a single ratchet tooth on the shaft for each gear wheel, and a pawl on the latter engaging the tooth when the shaft is rotated in one direction, a handle for rotating the shaft and a stop engaging the handle for arresting its movement at each complete revolution.

12. In a calculating machine, the combination with computing wheels having ratchet teeth thereon, a carrying lever actuated by the lower wheel and provided with a pawl engaging the said teeth upon the adjacent higher wheel, a locking device adapted to engage the lower wheel and operated by the carrying lever and means for releasing said devices, of a shaft, resetting wheels thereon coöperating with the computing wheels to set them in the starting position and means for revolving the shaft, a cam on the latter and means actuated thereby for operating the lock releasing means.

GEORGE H. SEARS.

Witnesses:
G. WILLARD RICH,
ELIZABETH J. PERRY.